US009586469B2

United States Patent
Orita (10) Patent No.: US 9,586,469 B2
(45) Date of Patent: Mar. 7, 2017

(54) HYBRID VEHICLE CONTROL DEVICE

(71) Applicant: Nissan Motor Co., Ltd., Yokohama-shi, Kanagawa (JP)

(72) Inventor: Shuichi Orita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/917,136

(22) PCT Filed: Oct. 9, 2013

(86) PCT No.: PCT/JP2013/077433
§ 371 (c)(1),
(2) Date: Mar. 7, 2016

(87) PCT Pub. No.: WO2015/052789
PCT Pub. Date: Apr. 16, 2015

(65) Prior Publication Data
US 2016/0200316 A1 Jul. 14, 2016

(51) Int. Cl.
*B60L 9/00* (2006.01)
*B60K 6/48* (2007.10)
(Continued)

(52) U.S. Cl.
CPC ........... *B60K 6/48* (2013.01); *B60K 6/26* (2013.01); *B60K 6/543* (2013.01); *B60W 10/06* (2013.01);
(Continued)

(58) Field of Classification Search
CPC .... B60K 2006/268; B60K 6/387; B60K 6/48; B60K 6/26; B60K 6/543; B60W 10/06; B60W 10/08
(Continued)

(56) References Cited

U.S. PATENT DOCUMENTS 6,253,127 B1 * 6/2001 Itoyama ................ B60K 6/442
123/179.1
6,655,485 B1 * 12/2003 Ito ........................ B60W 20/40
180/65.6
(Continued)

FOREIGN PATENT DOCUMENTS

| EP | 2 055 565 | 5/2009 |
|---|---|---|
| JP | 2000-204997 A | 7/2000 |

(Continued)

*Primary Examiner* — Gertrude Arthur Jeanglaud
(74) *Attorney, Agent, or Firm* — Global IP Counselors, LLP (57) ABSTRACT

A hybrid vehicle control device is provided for controlling a drive system in a hybrid vehicle. The hybrid vehicle control device is provided with a hybrid control module that begins engagement of a clutch, and cranks a transverse engine using a motor/generator as a drive source, when a request is made to start an engine in an EV mode. The hybrid control module has a "normal start mode" and a "sound and vibration prioritizing startup mode" as engine startup modes. The "normal start mode" prioritizes drive force response performance. The "sound and vibration prioritizing startup mode" prioritizes sound and vibration reduction performance. If a drive range is selected and the vehicle is stopped when an engine startup request is made, then the "sound and vibration prioritizing startup mode" is selected, and the transverse engine is started.

4 Claims, 5 Drawing Sheets (51) Int. Cl.
- *B60K 6/26* (2007.10)
- *B60K 6/543* (2007.10)
- *B60W 10/06* (2006.01)
- *B60W 10/08* (2006.01)
- *B60W 20/00* (2016.01)

(52) U.S. Cl.
CPC ............ *B60W 10/08* (2013.01); *B60W 20/40* (2013.01); *B60K 2006/268* (2013.01); *B60Y 2200/92* (2013.01); *B60Y 2300/188* (2013.01); *B60Y 2300/43* (2013.01); *B60Y 2300/60* (2013.01); *Y02T 10/6221* (2013.01); *Y02T 10/6286* (2013.01); *Y10S 903/93* (2013.01)

(58) Field of Classification Search
USPC .... 701/22, 36, 54, 67; 180/65.265; 903/930, 903/946
See application file for complete search history.

(56) References Cited

U.S. PATENT DOCUMENTS

| | | | | |
|---|---|---|---|---|
| 7,207,404 | B2* | 4/2007 | Ito | B60W 20/40 180/65.28 |
| 7,351,182 | B2* | 4/2008 | Kobayashi | B60K 6/48 477/5 |
| 2005/0131239 | A1* | 6/2005 | Blazecka | C07D 307/60 549/295 |

FOREIGN PATENT DOCUMENTS

| | | |
|---|---|---|
| JP | 2008-162491 A | 7/2008 |
| JP | 2010-137823 A | 6/2010 |
| JP | 2011-218924 A | 11/2011 |
| JP | 2013-155605 A | 8/2013 |
| JP | 2013-159330 A | 8/2013 |

* cited by examiner

HYBRID VEHICLE CONTROL DEVICE

CROSS-REFERENCE TO RELATED APPLICATIONS

This application is a U.S. National stage application of International Application No. PCT/JP2013/077433, filed Oct. 9, 2013.

BACKGROUND

Field of the Invention

The present invention relates to a hybrid vehicle control device for carrying out an engine start control, in which, when there is an engine start request, uses a motor as an engine starter, begins engagement of a clutch, and cranks the engine.

Background Information

Conventionally, a hybrid vehicle comprising, in a drive system, a starter motor, an engine, and a power motor, and which switches between, as engine start modes, an engine start mode that uses the starter motor, and an engine start mode that uses the power motor, is known (for example, refer to Japanese Laid Open Patent Application No. 2013-159330).

SUMMARY

However, a conventional hybrid vehicle is configured so that, if there is an engine start request when stopped, an engine start mode that uses the power motor is selected when selecting the neutral range, and an engine start mode that uses the starter motor is selected in other cases. Consequently, there is the problem that, in a quiet cabin interior environment, for example, when stopped at a traffic light while depressing the brake in the D range (drive range), noise and vibration which are uncomfortable for passengers would be generated if an engine start mode that uses the starter motor is selected.

In view of the problem described above, an object of the present invention is to provide a hybrid vehicle control device capable of achieving a quiet engine start wherein the generation of noise and vibration is suppressed when a drive range is selected and when the required driving force is small.

In order to achieve the object above, the present invention comprises a drive system including an engine, a clutch, a motor and a drive wheel. The hybrid vehicle control device is provided with an engine start control means that begins engagement of the clutch and cranks the engine using the motor as an engine starter, when there is an engine start request in an EV mode that uses the motor as a drive source. The engine start control means comprises as engine start modes: a normal start mode that prioritizes drive force response performance, and a sound and vibration prioritizing startup mode that prioritizes sound and vibration reduction performance; if conditions that the drive range is selected and the required driving force is small are satisfied at the time of an engine start request, the sound and vibration prioritizing startup mode is selected to start the engine.

Thus, if conditions that the drive range is selected and the required driving force is small are satisfied at the time of an engine start request, the sound and vibration prioritizing startup mode, which prioritizes the sound and vibration reduction performance, is selected to start the engine. That is, when comprising, as engine start modes, a normal start mode that prioritizes drive force response performance, and a sound and vibration prioritizing startup mode that prioritizes sound and vibration reduction performance, the sound and vibration prioritizing startup mode is selected when, normally, the park range (P, N range) is selected. In contrast, there are situations with low background noise in which the passenger becomes sensitive to vibration and noise caused by engine start, such as when stopped by depressing the brake, even when the drive range (D, R range) is selected. With a focus on this point, the invention is configured to select the sound and vibration prioritizing startup mode, if conditions that the drive range is selected and the required driving force is small are satisfied at the time of an engine start request, by expanding the range position selection condition to the drive range selection condition. As a result, it is possible to achieve quiet engine start wherein the generation of noise and vibration is suppressed when a drive range is selected and when the required driving force is low.

BRIEF DESCRIPTION OF THE DRAWINGS

Referring now to the attached drawings which form a part of this original disclosure.

DETAILED DESCRIPTION OF THE EMBODIMENTS

A preferred embodiment for realizing the hybrid vehicle control device of the present invention is described below based on the first embodiment illustrated in the drawings.

First Embodiment

The configuration is described first. The "overall system configuration," and the "detailed configuration of the engine start control" will be separately described regarding the configuration of the FF hybrid vehicle (one example of a hybrid vehicle) to which is applied the control device of the first embodiment.

Overall System Configuration

Figure 1:
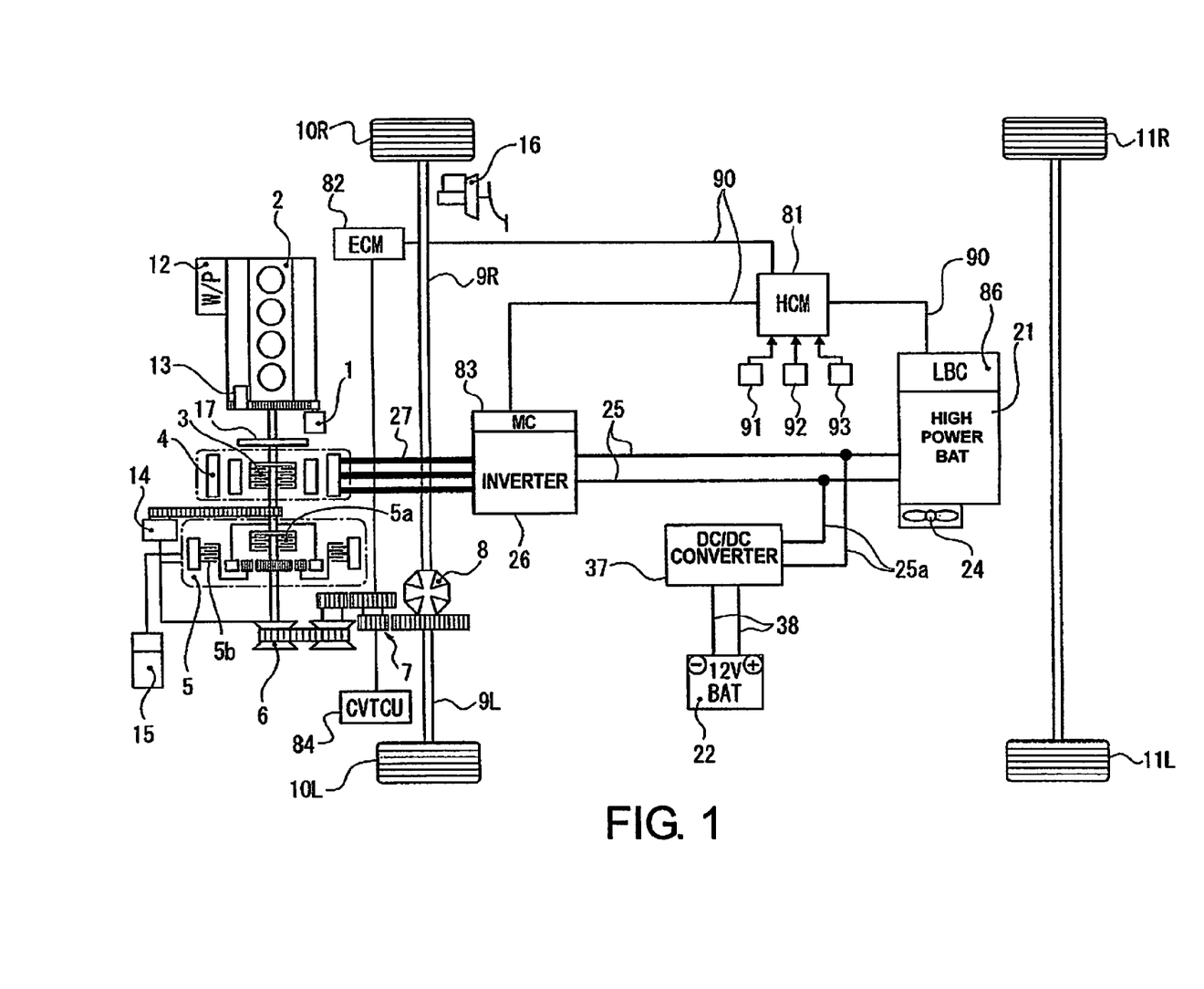
FIG. 1 is an overall system view illustrating an FF hybrid vehicle to which is applied the control device of the first embodiment.

FIG. 1 illustrates the overall system of an FF hybrid vehicle. The overall system configuration of the FF hybrid vehicle will be described below, based on FIG. 1.

A drive system of an FF hybrid vehicle is provided with a starter motor 1, a transverse engine 2, a first clutch 3 (abbreviated "CL1"), a motor/generator 4 (abbreviated "MG"), a second clutch 5 (abbreviated "CL2"), and a belt type continuously variable transmission 6 (abbreviated "CVT"), as illustrated in FIG. 1. An output shaft of the belt type continuously variable transmission 6 is drivingly coupled to left and right front wheels 10R, 10L, via a final reduction gear train 7, a differential gear 8, and left and right drive shafts 9R, 9L. The left and right rear wheels 11R, 11L are configured as driven wheels.

The starter motor 1 is a cranking motor having a gear that meshes with an engine starting gear provided to a crankshaft of the transverse engine 2, and which rotationally drives the crankshaft at the time of engine start.

The transverse engine 2 is an engine disposed in a front room with the crankshaft direction as the vehicle width direction, comprising an electric water pump 12, and a crankshaft rotation sensor 13 that detects a reverse rotation of the transverse engine 2. This transverse engine 2 comprises, as starting methods, a "starter startup mode" that carries out cranking by a starter motor 1 that has a 12V battery 22 as the power source, and an "MG start mode" that carries out cranking by the motor/generator 4 while slip engaging the first clutch 3. The "starter startup mode" is selected when a low-temperature condition or a high-temperature condition is satisfied, and the "MG start mode" is selected when starting the engine under a condition other than starter startup. In addition, the "MG start mode" includes, a "normal start mode" that prioritizes drive force response performance and a "sound and vibration prioritizing startup mode" that prioritizes sound and vibration reduction performance.

The first clutch 3 is a hydraulically actuated normally open dry multi-plate friction clutch which is interposed between the transverse engine 2 and the motor/generator 4, in which complete engagement/slip engagement/disengagement are controlled by a first clutch hydraulic pressure.

The motor/generator 4 is a three-phase alternating current permanent magnet type synchronous motor which is coupled to the transverse engine 2 via the first clutch 3. This motor/generator 4 uses a high power battery 21 described below as the power source, and an inverter 26, which converts direct current to three-phase alternating current during powering and converts three-phase alternating current to direct current during regeneration, is connected to the stator coil via an AC harness 27.

The second clutch 5 is a hydraulically actuated normally open dry multi-plate friction clutch which is interposed between the motor/generator 4 and the left and right front wheels 10R, 10L, which are drive wheels, in which complete engagement/slip engagement/disengagement are controlled by a second clutch hydraulic pressure. The second clutch 5 of the first embodiment is configured by diverting a forward clutch 5a and a reverse brake 5b provided to a forward/reverse switching mechanism of the belt type continuously variable transmission 6 configured by a planetary gear. That is, the forward clutch 5a is used as the second clutch 5 during forward traveling, and the reverse brake 5b is used as the second clutch 5 during reverse traveling.

The belt type continuously variable transmission 6 is a transmission that achieves a stepless transmission ratio by changing the winding diameter of the belt by applying shifting hydraulic pressure to a primary oil chamber and a secondary oil chamber. This belt type continuously variable transmission 6 comprises a main oil pump 14 (mechanical drive), a sub oil pump 15 (motor drive), and an unillustrated control valve unit that produces the first and second clutch hydraulic pressure and the shifting hydraulic pressure, using the line pressure PL generated by adjusting the pump discharge pressure from the main oil pump 14 as the source pressure. The main oil pump 14 is rotationally driven by a motor shaft of the motor/generator 4 (transmission input shaft). The sub oil pump 15 is mainly used as an auxiliary pump for producing lubrication and cooling oil.

A one-motor-two-clutch drive system is configured by the first clutch 3, the motor/generator 4, and the second clutch 5, and this drive system comprises an "EV mode," an "HEV mode," and an "HEV WSC mode" as the main traveling modes (drive modes) thereof. The "EV mode" is an electric vehicle mode in which the first clutch 3 is released and the second clutch 5 is engaged, and in which the motor/generator 4 is the only drive source; traveling by this "EV mode" is referred to as "EV traveling". The "HEV" mode is a hybrid vehicle mode in which both clutches 3, 5 are engaged, and in which the transverse engine 2 and the motor/generator 4 are the drive sources; traveling by this "HEV mode" is referred to as "HEV traveling." The "HEV WSC mode" is a CL2 slip engagement mode in which the motor/generator 4 is subjected to motor rotational speed control, and the second clutch 5 is slip engaged at a capacity corresponding to the required driving force in the "HEV mode." This "HEV WSC mode" is selected to absorb the rotational difference between the transverse engine 2 (idling rotational speed or greater) and the left and right front wheels 10L, 10R by CL2 slip engagement, between the stopped to the starting regions in the "HEV mode," by not having a rotational difference absorption joint in the drive system, such as a torque converter.

The regenerative cooperation brake unit 16 in FIG. 1 is a device that controls the total braking torque, accompanying the fact that regenerative operation is carried out in principle during brake operation. This regenerative cooperation brake unit 16 comprises a brake pedal, a negative pressure booster that uses the intake negative pressure of the transverse engine 2, and a master cylinder. Then, at the time of a brake operation, the unit carries out a cooperative control of the regeneration amount/fluid pressure amount, so that the amount obtained by subtracting the regenerative braking force from the requested braking force based on the pedal operation amount is allotted to the hydraulic braking force.

The power supply system of the FF hybrid vehicle is provided with a high power battery 21 as the motor/generator power source, and a 12V battery 22 as a 12V system load power source, as illustrated in FIG. 1.

The high power battery 21 is a secondary battery mounted as the power source of the motor/generator 4, and, for example, a lithium ion battery is used therefor, in which a cell module configured from a number of cells is set inside a battery pack case. A junction box which aggregates a relay circuit for carrying out supply/cutoff/distribution of heavy current is built in to this high power battery 21, and further attached thereto are a cooling fan unit 24 having a battery cooling function, and a lithium battery controller 86 which monitors the battery charge capacity (battery SOC) and the battery temperature.

The high power battery 21 and the motor/generator 4 are connected via a DC harness 25, an inverter 26, and an AC harness 27. A motor controller 83 for performing powering/regeneration control is attached to the inverter 26. That is, the inverter 26 converts the direct current from the DC harness 25 to a three-phase alternating current to the AC harness 27 during powering, when the motor/generator 4 is driven by the discharge of the high power battery 21. In addition, the inverter converts the three-phase alternating current from the AC harness 27 to a direct current to the DC harness 25, during regeneration for charging the high power battery 21 with the power generation by the motor/generator 4.

The 12V battery 22 is a secondary battery mounted as a power source of the starter motor 1 and a 12V system load, which is an auxiliary machine; for example, a lead battery mounted on an engine vehicle or the like is used. The high power battery 21 and the 12V battery 22 are connected via a DC branch harness 25a, a DC/DC converter 37, and a battery harness 38. The DC/DC converter 37 is for converting several hundred volts from the high power battery 21 to 12V, which is configured to manage the charging amount of the 12V battery 22 by controlling this DC/DC converter 37 with the hybrid control module 81.

The control system of an FF hybrid vehicle comprises a hybrid control module 81 (abbreviated: "HCM") as an integrated control means having a function to appropriately manage the energy consumption of the entire vehicle, as illustrated in FIG. 1. An engine control module 82 (abbreviated: "ECM"), a motor controller 83 (abbreviated: "MC"), a CVT control unit 84 (abbreviated "CVTCU"), and a lithium battery controller 86 (abbreviated: "LBC") are provided as control means that are connected to this hybrid control module 81. These control means including the hybrid control module 81 are connected so as to be capable of exchanging bidirectional information by a CAN communication line 90 (CAN is an abbreviation for "Controller Area Network").

The hybrid control module 81 carries out various controls, based on input information from each of the control means, an ignition switch 91, an accelerator position opening amount sensor 92, a vehicle speed sensor 93, and the like. The engine control module 82 carries out fuel injection control, ignition control, fuel cut control, and the like of the transverse engine 2. The motor controller 83 carries out powering control, regenerative control, and the like of the motor/generator 4 by the inverter 26. The CVT control unit 84 carries out the engagement hydraulic pressure control of the first clutch 3, the engagement hydraulic pressure control of the second clutch 5, the shifting hydraulic pressure control of the belt type continuously variable transmission 6, and the like. The lithium battery controller 86 manages the battery SOC, the battery temperature, and the like of the high power battery 21.

Detailed Configuration of the Engine Start Control

Figure 2:
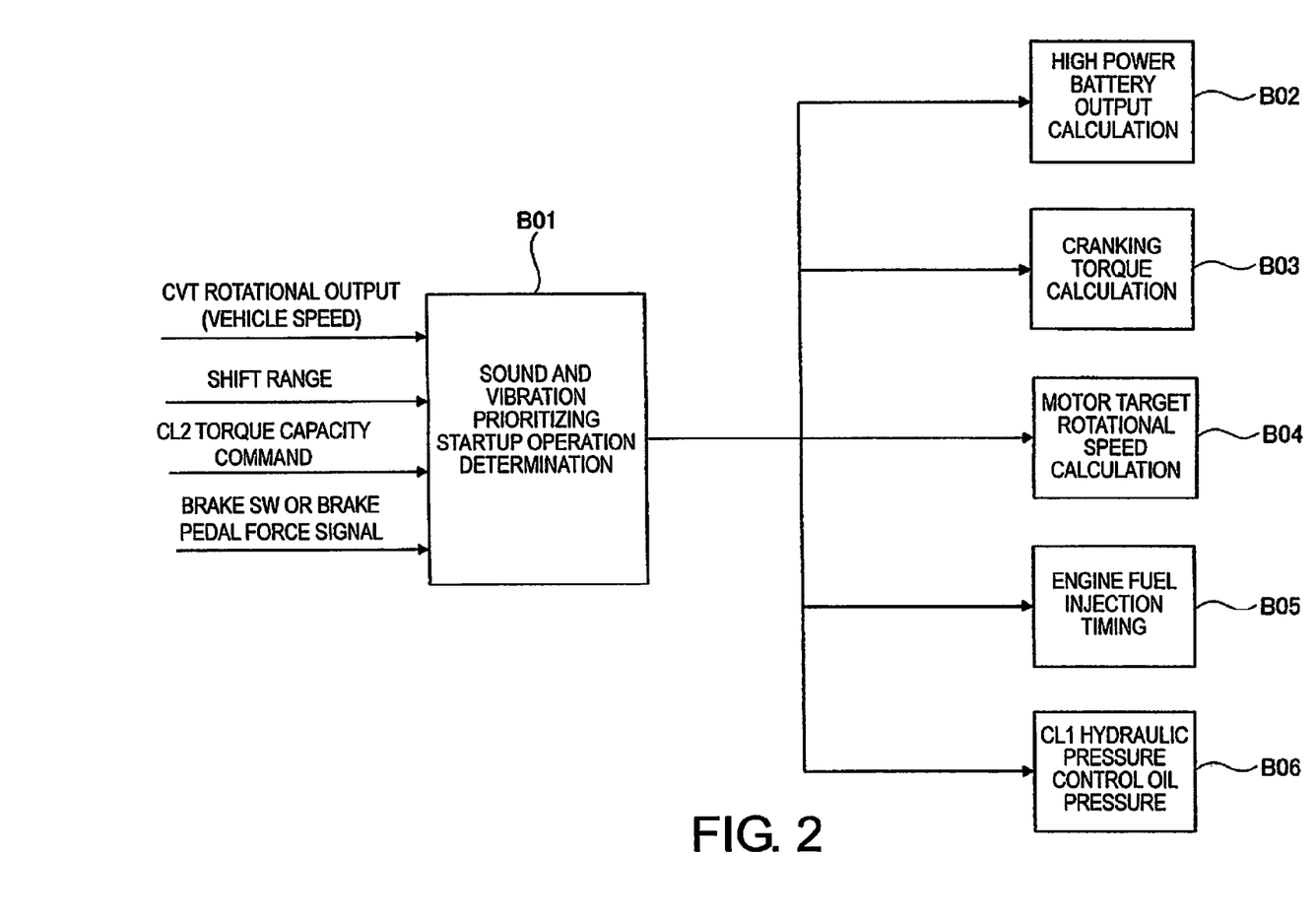
FIG. 2 is a block view illustrating a configuration example of an engine start control by a sound and vibration prioritizing startup included in the hybrid control module of the first embodiment.

FIG. 2 illustrates a configuration example of an engine start control by a sound and vibration prioritizing startup included in the hybrid control module of the first embodiment.

The engine start control configuration according to a sound and vibration prioritizing startup comprises a sound and vibration prioritizing startup operation determination block B01, a high power battery output calculation block B02, a cranking torque calculation block B03, a motor target rotational speed calculation block B04, an engine fuel injection timing calculation block B05, and a CL1 hydraulic pressure control block B06, as illustrated in FIG. 2.

The sound and vibration prioritizing startup operation determination block B01 inputs a CVT output rotation (vehicle speed), a shift range, a CL2 torque capacity command, a brake SW or a brake stepping force signal. Then, if one of the following conditions (a), (b) is satisfied by a determination based on the input information, a sound and vibration prioritizing startup operation determination signal is outputted to each of the blocks B02, B03, B04, B05, B06.

(a) P, N range
(b) Other than P, N range, and brake ON, and CL2 torque capacity command equal to or less than predetermined, and vehicle speed equal to or less than predetermined value (determination lower limit value).

If the above conditions (a), (b) are not satisfied during engine start in the sound and vibration prioritizing startup mode, the mode is switched to the normal start mode, which prioritizes the drive force.

When a sound and vibration prioritizing startup operation determination signal from the sound and vibration prioritizing startup operation determination block B01 is inputted, the high power battery output calculation block B02 augments the output of the high power battery 21.

When a sound and vibration prioritizing startup operation determination signal from the sound and vibration prioritizing startup operation determination block B01 is inputted, the cranking torque calculation block B03 increases the torque to a value that is equal to or greater than a cranking torque of a normal start mode within a range having an allowance in the motor torque.

When a sound and vibration prioritizing startup operation determination signal from the sound and vibration prioritizing startup operation determination block B01 is inputted, the motor target rotational speed calculation block B04 increases the rotational speed to a value that is equal to or greater than a motor target rotational speed of a normal start mode within a range having an allowance in the motor output. However, increasing the cranking torque is prioritized.

When a sound and vibration prioritizing startup operation determination signal from the sound and vibration prioritizing startup operation determination block B01 is inputted, even if the engine rotational speed reaches the fuel injection rotational speed, the engine fuel injection timing calculation block B05 thereafter delays the fuel injection timing until the cranking rotation which develops the engine negative pressure is ended.

When a sound and vibration prioritizing startup operation determination signal from the sound and vibration prioritizing startup operation determination block B01 is inputted, the CL1 hydraulic pressure control block B06 does not decrease the CL1 hydraulic pressure when in the sound and vibration prioritizing startup mode, in contrast to having temporarily decreased the CL1 hydraulic pressure when the engine rotational speed reached the fuel injection rotational speed in the normal start mode.

Figure 3:
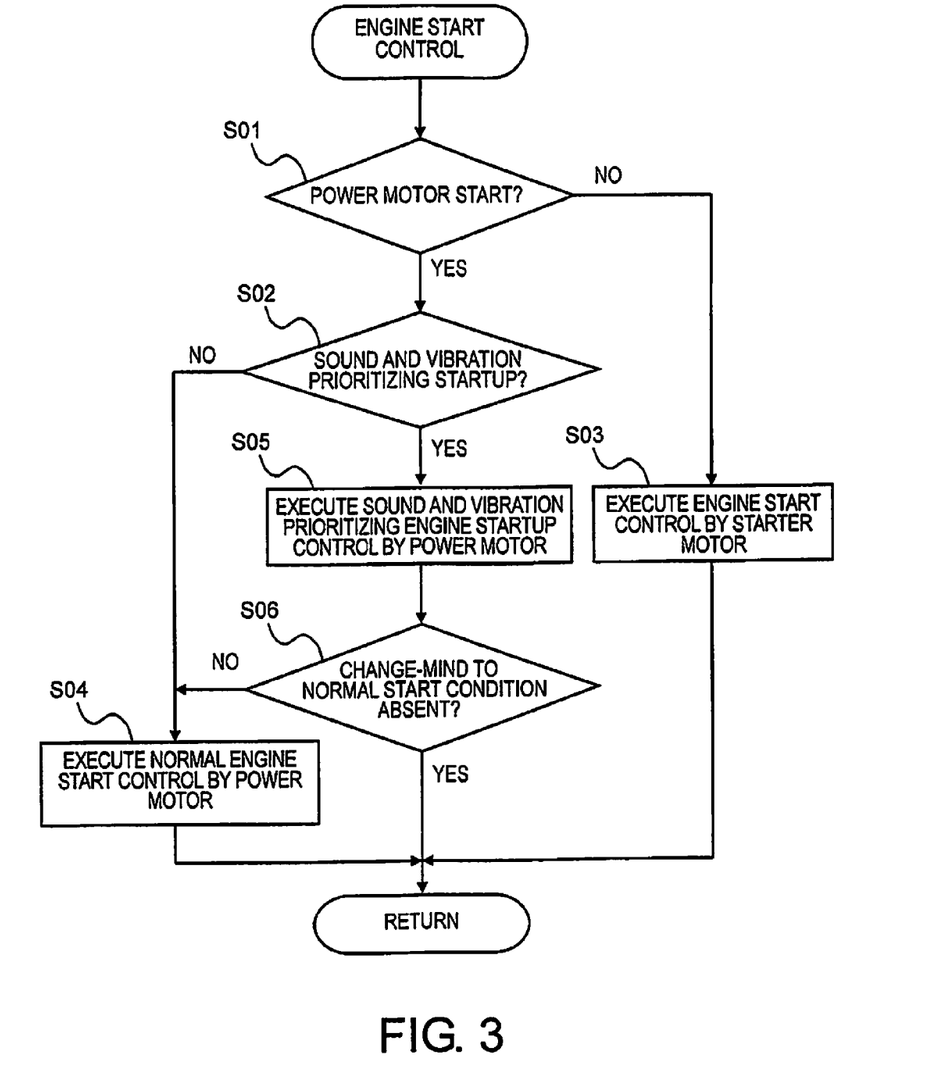
FIG. 3 is a flowchart illustrating the flow of the engine start control steps executed by the hybrid control module of the first embodiment.

FIG. 3 illustrates the flow of the engine start control steps (engine start control means) executed by the hybrid control module 81. Each step in FIG. 3 showing the configuration of the engine start control steps will be described below. This flow chart is started with an output of an engine start request, and ended by an engine start completion determination of the transverse engine 2.

In Step S01, it is determined whether or not the startup is a power motor start (MG start). If YES (power motor start), the steps proceed to Step S02, and if NO (starter motor startup), the steps proceed to Step S03. Here, the determination of the power motor start is determined to be a power motor start, when the condition is other than that of a starter motor startup. The starter motor startup condition is when one of the following conditions at a low temperature (engine water temperature, high power battery temperature, T/M oil temperature are predetermined values or lower)

at a high temperature (motor temperature, high power battery temperature are predetermined values or higher)

is satisfied, when it is determined to be a starter motor startup.

In Step S02, following the power motor start determination in Step S01, it is determined whether or not the startup is a sound and vibration prioritizing startup. If YES (sound and vibration prioritizing startup), the steps proceed to Step S05, and if NO (normal start), the steps proceed to Step S04. Here, the determination that the startup is a sound and vibration prioritizing startup is carried out by one of the above-described sound and vibration prioritizing startup conditions (a), (b) being satisfied.

In Step S03, following the starter motor startup determination in Step S01, an engine start control by the starter motor 1 (control by the "starter startup mode") is executed, and the steps proceed to RETURN.

In Step S04, following the normal start determination in Step S02, and a determination that a change-mind is present in Step S06, a normal engine start control (control by the "normal start mode") by the motor/generator 4 (power motor) is executed, and the steps proceed to RETURN.

In Step S05, following the sound and vibration prioritizing startup determination in Step S02, a sound and vibration prioritizing engine startup control (control by the "sound and vibration prioritizing startup mode") by the motor/generator 4 (power motor) is executed, and the steps proceed to Step S06.

In Step S06, following the execution of the sound and vibration prioritizing engine startup control in Step S05, it is determined whether or not a change-mind to the normal start condition is absent. If YES (change-mind absent), the steps proceed to RETURN, and if NO (change-mind present), the steps proceed to Step SO4. Here, "change-mind absent" is determined by one of the above-described sound and vibration prioritizing startup conditions (a), (b) being satisfied during a sound and vibration prioritizing engine startup control. "Change-mind present" is determined by one of the above-described sound and vibration prioritizing startup conditions (a), (b) becoming unsatisfied during a sound and vibration prioritizing engine startup control.

Next, the actions are described. The engine start control action, engine start control action by the sound and vibration prioritizing startup mode will be separately described regarding the actions of the FF hybrid vehicle control device of the first embodiment.

Effect of the Engine Start Control

The engine start control action when there is an engine start request will be described based on the flowchart illustrated in FIG. 3.

First, when there is an engine start request, if the starter motor startup condition is satisfied, a flow that progresses from Step S01→Step S03→RETURN in the flowchart in FIG. 3 is repeated. In Step S03, an engine start control by the "starter startup mode" using the starter motor 1 is executed.

Next, when there is an engine start request, if the starter motor startup condition is not satisfied, and the sound and vibration prioritizing startup condition is not satisfied, a flow that progresses from Step S01→Step S02→Step S04→RETURN in the flowchart in FIG. 3 is repeated. In Step S04, an engine start control by the "normal start mode" using the motor/generator 4 (power motor) is executed.

On the other hand, when there is an engine start request, if the starter motor startup condition is not satisfied but the sound and vibration prioritizing startup condition is satisfied, the steps proceed from Step S01→Step S02→Step S05, in the flowchart in FIG. 3. In Step S05, an engine start control by the "sound and vibration prioritizing startup mode" using the starter motor/generator 4 (power motor) is executed. Then, during the engine start control by the "sound and vibration prioritizing startup mode", the steps proceed from Step S05 to Step S06; in Step S06, it is determined whether or not a change-mind to the normal start condition is absent. If "change-mind absent" is determined in Step S06, the sound and vibration prioritizing engine startup control is continued as is. However, if "change-mind present" is determined in Step S06, the steps proceed from Step S06 to Step S04, and the engine start control by the "sound and vibration prioritizing startup mode" is switched to an engine start control by the "normal start mode."

As described above, in the first embodiment, a configuration is employed in which, if conditions that the drive range is selected and the required driving force is small are satisfied at the time of an engine start request, the sound and vibration prioritizing startup mode, which prioritizes the sound and vibration reduction performance, is selected to start the transverse engine 2. That is, when comprising, as engine start modes, a "normal start mode" that prioritizes drive force response performance, and a "sound and vibration prioritizing startup mode" that prioritizes sound and vibration reduction performance, the "sound and vibration prioritizing startup mode" is selected when, normally, the park range (P, N range) is selected. In contrast, there are situations with low background noise in which the passenger becomes sensitive to vibration and noise caused by engine start, such as when stopped by depressing the brake, even when the drive range (D, R range) is selected. With a focus on this point, the invention is configured to select the "sound and vibration prioritizing startup mode," if conditions that the drive range is selected and the required driving force is small are satisfied at the time of an engine start request, by expanding the range position selection condition to the drive range selection condition. As a result, it is possible to achieve quiet engine start wherein the generation of noise and vibration is suppressed when a drive range is selected and when the required driving force is low.

In the first embodiment, a configuration was employed in which, when an engine start control by the "sound and vibration prioritizing startup mode" is executed, if the selection condition of the "sound and vibration prioritizing startup mode" becomes not satisfied, the mode is switched to the "normal start mode." That is, in the case of the "sound and vibration prioritizing startup mode," a drive force cannot be immediately generated, since the fuel injection timing is being delayed. Consequently, if, immediately after stopping by depressing the brake in the D range, the foot is taken away from the brake and an accelerator depression operation is carried out with the intention of starting, and the "sound and vibration prioritizing startup mode" is being maintained, generation of a drive force to start the vehicle is delayed, and the starting performance is reduced. In contrast, the embodiment is configured to switch to the "normal start mode" if the selection condition of the "sound and vibration prioritizing startup mode" becomes not satisfied by the foot being taken away from the brake or by a generation of vehicle speed. Therefore, if a startup is intended immediately after a brake stop, the fuel injection timing of the transverse engine 2 is expedited, and starting performance can be secured by generating a drive force necessary for starting without a delay in response.

In the first embodiment, a configuration was employed in which the selection condition of the "sound and vibration prioritizing startup mode" is set to the conditions of drive range selected, and stopped by a brake operation. Therefore, when waiting for a traffic signal while stopped with the brake depressed in the drive range (D range), and the transverse engine 2 is started in a stop state, the transverse engine 2 can be quietly started with a priority given to the sound vibration performance.

Engine Start Control Action by the Sound and Vibration Prioritizing Startup Mode The engine start control action by the "sound and vibration prioritizing startup mode" will be described based on the time chart illustrated in FIG. 4-FIG. 6.

Figure 4:
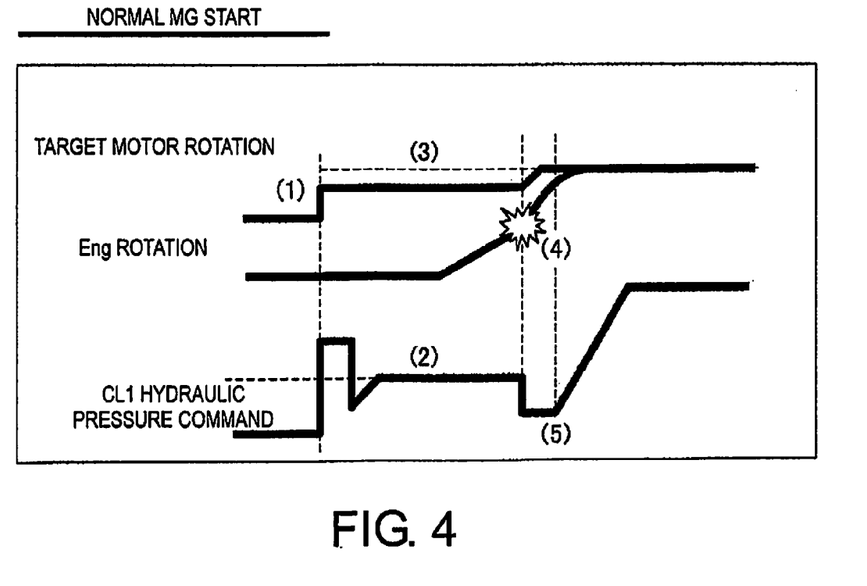
FIG. 4 is a time chart illustrating each characteristic of the target motor rotation/engine rotation/CL1 hydraulic pressure command in the normal MG start mode, of the engine start steps of the first embodiment.

An engine start control by the "normal start mode" is carried out in accordance with the time chart illustrated in FIG. 4. That is, (1) High power battery output is not expanded (N second rated value).
(2) Cranking torque shall be Mt.
(3) Cranking motor rotational speed shall be Mn.
(4) Fuel injection timing shall be such that immediate fuel injection is carried out when the engine rotational speed becomes the fuel injection rotational speed.
(5) Hydraulic pressure of the first clutch CL1 is temporarily reduced in accordance with the fuel injection timing.

Therefore, the fuel injection timing is expedited by the immediate injection of (4), and the motor torque can be routed to the drive force with the reduction of the CL1 hydraulic pressure (5); therefore, an engine start control that prioritizes the drive force response performance is achieved.

Figure 6:
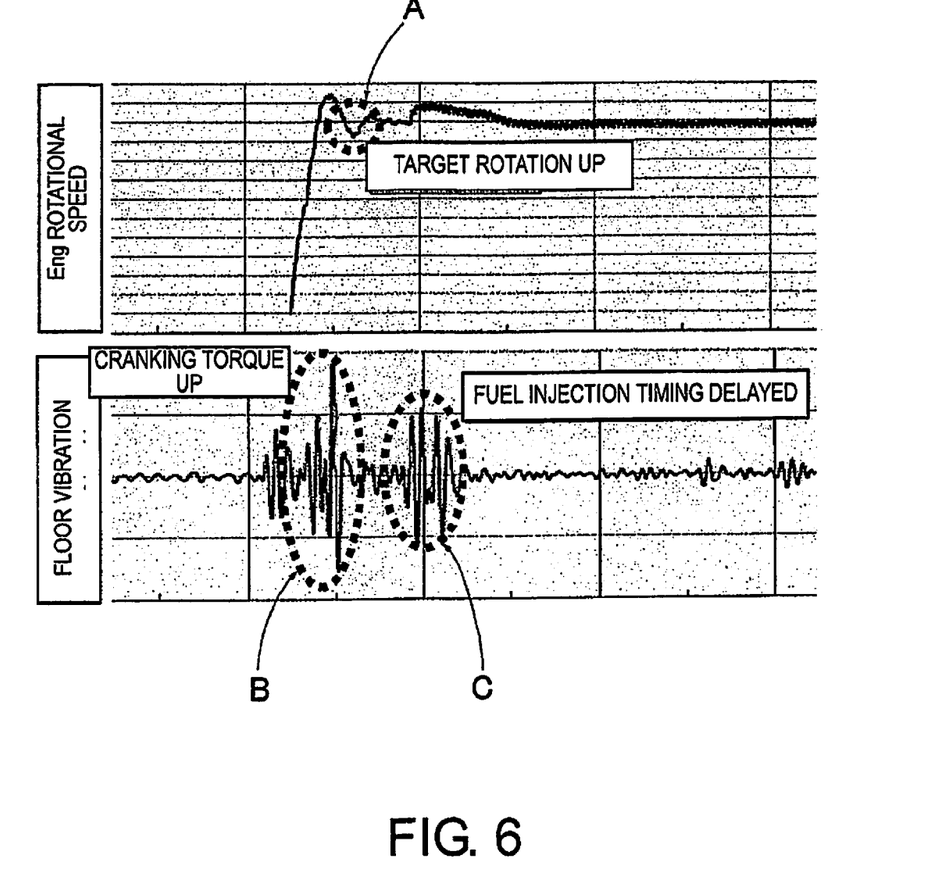
FIG. 6 is a characteristic view illustrating the engine rotational speed characteristic and the floor vibration characteristic when carrying out engine start by the normal MG start mode, of the engine start steps of the first embodiment.

However, since the cranking torque and the cranking motor rotational speed are low, the engine rotational speed is reduced during the engine start control, as illustrated by the arrow A in FIG. 6. Consequently, the engine rotational speed becomes stagnant in the resonance band of the engine mount or the vehicle body resonance band, and floor vibration is generated in the engine cranking region, as illustrated by the arrow B in FIG. 6. In addition, without waiting for the development of the engine negative pressure, by immediately carrying out injection when the engine rotational speed becomes the fuel injection rotational speed, floor vibration due to the initial explosion torque is generated, as illustrated by the arrow C in FIG. 6.

Figure 5:
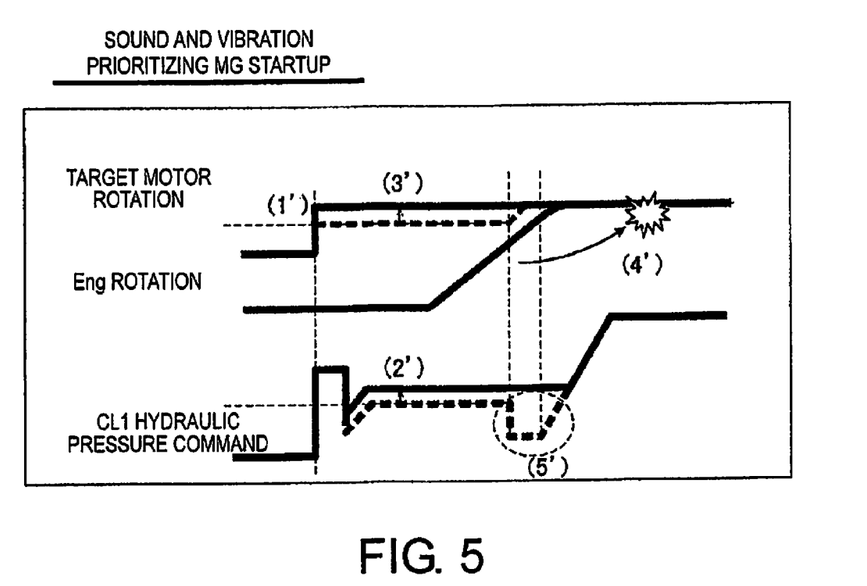
FIG. 5 is a time chart illustrating each characteristic of the target motor rotation/engine rotation/CL1 hydraulic pressure command in the sound and vibration prioritizing MG start mode, of the engine start steps of the first embodiment.

In contrast, the engine start control by the "sound and vibration prioritizing startup mode" is carried out in accordance with the time chart illustrated in FIG. 5. That is, (1') High power battery output is expanded (n second (<N second) rated value).
(2') Cranking torque shall be a torque greater than Mt.
(3') Cranking motor rotational speed shall be a rotational speed higher than Mn. However, increasing the cranking torque is prioritized.
(4') Fuel injection timing shall be after cranking rotation is carried out until the engine negative pressure is developed.
(5') Hydraulic pressure of the first clutch CL1 is not reduced.

Therefore, with the increase in the cranking torque of (2'), the engine mount resonance band of 200 rpm-400 rpm is quickly passed through. By increasing the cranking motor rotational speed of (3'), the engine rotational speed is not stagnated in the vehicle body resonance band in the vicinity of 800 rpm. Accordingly, floor vibration illustrated by the arrow B in FIG. 6 being generated in the engine cranking region can be suppressed.

In addition, due to a delay in the fuel injection timing of (4'), the initial explosion torque is decreased by carrying out fuel injection after the engine negative pressure has sufficiently developed, and floor vibration illustrated by the arrow C in FIG. 6 being generated by the initial explosion torque can be suppressed.

As described above, in the first embodiment, when cranking in the "sound and vibration prioritizing startup mode," the output from the high power battery 21, which is a power source of the motor/generator, is temporarily expanded. Then, a configuration of a control was employed in which the cranking torque and the cranking motor rotational speed are increased, compared to an engine start control by the "normal start mode." With this control configuration, the engine start control becomes one in which the engine mount resonance band is quickly passed through, and the engine rotation is not stagnated in the vehicle body resonance band. Therefore, floor vibration being generated by an engine mount resonance or a vehicle body resonance when in the engine cranking region during an engine start control by the "sound and vibration prioritizing startup mode" can be suppressed.

In the first embodiment, a configuration was employed in which, when carrying out a fuel injection in the "sound and vibration prioritizing startup mode," the fuel injection start timing is delayed compared to an engine start control by the "normal start mode," in which fuel injection is immediately started with an increase in the cranking rotation speed. With this control configuration, the engine start control becomes one in which the initial explosion torque is small, due to fuel injection being carried out after the engine negative pressure has been sufficiently developed. Therefore, floor vibration being generated by the initial explosion torque when in the fuel injection region at the time of an engine start control by the "sound and vibration prioritizing startup mode" can be suppressed.

Next, the effects are described. The effects listed below can be obtained with the FF hybrid vehicle control device according to the first embodiment.

(1) A hybrid vehicle (FF hybrid vehicle) control device for a drive system comprising, an engine (the transverse engine 2), a clutch (the first clutch 3), a motor (the motor/generator 4) and a drive wheel (left and right front wheels 10L, 10R), wherein the hybrid vehicle control device comprises an engine start control means (hybrid control module 81) that begins engagement of the clutch (first clutch 3), and cranks the engine (transverse engine 2) using the motor (the motor/generator 4) as an engine starter, when there is an engine start request in an EV mode that uses the motor (motor/generator 4) as a drive source, and the engine start control means (the hybrid control module 81, FIG. 3) comprises, as engine start modes, a normal start mode that prioritizes drive force response performance, and a sound and vibration prioritizing startup mode that prioritizes sound and vibration reduction performance, the sound and vibration prioritizing startup mode being selected to start the engine (the transverse engine 2) upon conditions that a drive range is selected and the required driving force is small are satisfied at the time of an engine start request. Accordingly, the present invention achieves quiet engine startup wherein the generation of noise and vibration is suppressed when a drive range is selected and when the required driving force is low.

(2) The engine start control means (hybrid control module 81, FIG. 3) switches to the normal start mode, if the selection condition of the sound and vibration prioritizing startup mode becomes not satisfied, when executing an engine start control by the sound and vibration prioritizing startup mode. Accordingly, in addition to the effect of (1), if a startup is intended immediately after a brake stop, the starting performance can be secured by generating a drive force necessary for starting without a delay in response.

(3) The engine start control means (hybrid control module 81, FIG. 3) sets the selection condition of the sound and vibration prioritizing startup mode to the conditions of drive range selected, and stopped by a brake operation. Accordingly, in addition to the effect of (1) or (2), when waiting for a traffic signal while stopped with the brake depressed in the drive range, and the engine (transverse engine 2) is started in a stop state, the engine (transverse engine 2) can be quietly started with a priority given to the sound vibration performance.

(4) When cranking in the sound and vibration prioritizing startup mode, the engine start control means (hybrid control module 81, FIG. 3) temporarily expands output from the high power battery 21, which is a power source of the motor (motor/generator 4), and carries out a control in which cranking torque and cranking motor rotational speed are increased as compared to an engine start control by the normal start mode (FIG. 5). Accordingly, in addition to the effects of (1)-(3), floor vibration being generated by an engine mount resonance or a vehicle body resonance when in the engine cranking region during an engine start control by the sound and vibration prioritizing startup mode can be suppressed.

(5) The engine start control means (hybrid control module 81, FIG. 3) carries out a control in which, when carrying out a fuel injection in the sound and vibration prioritizing startup mode, a fuel injection start timing is delayed as compared to an engine start control by the normal start mode, in which fuel injection is immediately started with an increase in a cranking rotation speed (FIG. 5). Accordingly, in addition to the effects of (1)-(4), floor vibration being generated by the initial explosion torque when in the fuel injection region at the time of an engine start control by the sound and vibration prioritizing startup mode can be suppressed.

The hybrid vehicle control device of the present invention was described above based on the first embodiment, but specific configurations thereof are not limited to this embodiment, and various modifications and additions to the design can be made without departing from the scope of the invention according to each claim in the Claims.

In the first embodiment, an example of an engine start control means was shown in which, if the conditions of drive range selected and stopped by a brake operation are satisfied at the time of an engine start request, the "sound and vibration prioritizing startup mode" is selected, and the transverse engine 2 is started. However, the engine start control means may be one in which, if the conditions of drive range selected, and stopped by a non-operation of the accelerator are satisfied, the "sound and vibration prioritizing startup mode" is selected, and the engine is started. In short, the condition that the required driving force is small may be determined by a brake operation or by an accelerator operation.

In the first embodiment, an example was shown in which the control device of the present invention is applied to an FF hybrid vehicle. However, the control device of the present invention is not limited to an FF hybrid vehicle, and may be applied to an FR hybrid vehicle or a 4WD hybrid vehicle as well. In short, the control device can be applied to any hybrid vehicle that carries out an engine start control, in which, when there is an engine start request, uses a motor as an engine starter, begins engagement of a clutch, and cranks the engine.

The invention claimed is:

1. A hybrid vehicle control device for controlling a drive system including an engine, a motor/generator, a clutch and a drive wheel, the hybrid vehicle control device comprising:
   a hybrid vehicle control module programmed to begin engagement of the clutch and cranks the engine uses the motor as an engine starter, when there is an engine start request in an EV mode that uses the motor as a drive source, and
   the hybrid vehicle control module being programmed to include as engine start modes a normal start mode that prioritizes drive force response performance, and a sound and vibration prioritizing startup mode that prioritizes sound and vibration reduction performance,
   the sound and vibration prioritizing startup mode being selected to start the engine upon conditions that a drive range is selected and the engine is stopped due to a brake operation are satisfied at a time of an engine start request,
   the start mode being switched to the normal start mode in which fuel injection is immediately started by an increase in a cranking rotation speed, if the conditions of the sound and vibration prioritizing startup mode becomes not satisfied due to a foot being taken away from a brake pedal with an intention to start, when there is an engine start request while brake stopped in the drive range and when executing an engine start control by the sound and vibration prioritizing startup mode.

2. The hybrid vehicle control device according to claim 1, wherein
   when cranking in the sound and vibration prioritizing startup mode, the hybrid vehicle control module is programmed to temporarily expand output from a high power battery, which is a power source of the motor, and carries out a control in which cranking torque and the cranking rotation speed are increased as compared to an engine start control by the normal start mode.

3. The hybrid vehicle control device according to claim 1, wherein
   the hybrid vehicle control module is programmed to perform a control in which, when carrying out fuel injection in the sound and vibration prioritizing startup mode, a fuel injection start timing is delayed as compared to an engine start control by the normal start mode, in which fuel injection is immediately started with an increase in a cranking rotation speed.

4. The hybrid vehicle control device according to claim 2, wherein
   the hybrid vehicle control module is programmed to perform a control in which, when carrying out fuel injection in the sound and vibration prioritizing startup mode, a fuel injection start timing is delayed as compared to the engine start control by the normal start mode, in which fuel injection is immediately started with an increase in the cranking rotation speed.

* * * * *